United States Patent
Brodsky et al.

(10) Patent No.: US 8,713,228 B2
(45) Date of Patent: *Apr. 29, 2014

(54) SHARED SYSTEM TO OPERATIONALLY CONNECT LOGIC NODES

(75) Inventors: William L. Brodsky, Binghamton, NY (US); Eric J. McKeever, Poughkeepsie, NY (US); John G. Torok, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 304 days.

This patent is subject to a terminal disclaimer.

(21) Appl. No.: 13/035,925

(22) Filed: Feb. 26, 2011

(65) Prior Publication Data

US 2012/0221761 A1    Aug. 30, 2012

(51) Int. Cl.
*G06F 13/00* (2006.01)
*H05K 1/00* (2006.01)
*H05K 5/00* (2006.01)

(52) U.S. Cl.
USPC .............. 710/100; 361/749; 361/752; 439/67

(58) Field of Classification Search
CPC ............. G06F 13/4086; G06F 13/385; G06F 13/4027; H05K 1/189; H05K 1/147; H05K 1/118; H05K 3/361; H05K 1/0393; H05K 3/284
USPC .............. 710/100, 311; 361/749–752; 439/67
See application file for complete search history.

(56) References Cited

U.S. PATENT DOCUMENTS

| | | | |
|---|---|---|---|
| 4,479,140 A | 10/1984 | Horvath | 257/713 |
| 4,730,233 A | 3/1988 | Osterman | 361/693 |
| 4,825,337 A | 4/1989 | Karpman | 361/716 |
| 4,829,404 A | 5/1989 | Jensen | 361/749 |
| 4,902,236 A | 2/1990 | Hasircoglu | 439/77 |
| 5,544,017 A | 8/1996 | Beilin et al. | 361/790 |
| 5,825,630 A | 10/1998 | Taylor et al. | 361/790 |
| 5,848,906 A | 12/1998 | Glusker et al. | 439/157 |
| 6,049,467 A | 4/2000 | Tamarkin et al. | 361/790 |
| 6,222,739 B1 | 4/2001 | Bhakta et al. | 361/790 |
| 6,332,790 B1 | 12/2001 | Ishikawa et al. | 439/157 |
| 6,362,974 B1 | 3/2002 | Lettang | 361/790 |
| 6,452,789 B1 | 9/2002 | Pallotti et al. | 361/679.02 |
| 6,672,878 B2 * | 1/2004 | Dean | 439/67 |
| 6,731,514 B2 | 5/2004 | Evans | 361/790 |
| 6,772,246 B2 | 8/2004 | Kim et al. | 710/62 |
| 6,822,874 B1 | 11/2004 | Marler | 361/752 |

(Continued)

FOREIGN PATENT DOCUMENTS

WO    WO 2010050919 A1 *    5/2010

OTHER PUBLICATIONS

Molex—"High-density FlexPlane Optical Circuitry provides high-density optical routing on PCBs or backplanes"; 3 pages, Dated 2012.*

*Primary Examiner* — Brian Misiura

(74) *Attorney, Agent, or Firm* — Dennis Jung; Ido Tuchman

(57) ABSTRACT

A shared system to operationally connect logic nodes may include an inter-nodal circuit to provide communications between any connected logic nodes. The system may also include a fabric bus carried by the inter-nodal circuit, the fabric bus to provide logical connections to a first logic node and any other logic node. The system may further include a clock circuit carried by the inter-nodal circuit that controls both the inter-nodal circuit and the fabric bus.

20 Claims, 17 Drawing Sheets

(56) References Cited

U.S. PATENT DOCUMENTS

| | | | |
|---|---|---|---|
| 6,879,032 B2 * | 4/2005 | Rosenau et al. | 257/696 |
| 6,935,868 B1 * | 8/2005 | Campini et al. | 439/67 |
| 6,966,784 B2 * | 11/2005 | Van Schuylenbergh et al. | 439/67 |
| 7,108,530 B2 | 9/2006 | Kimura et al. | 439/218 |
| 7,180,751 B1 | 2/2007 | Geschke et al. | 361/788 |
| 7,199,671 B2 * | 4/2007 | Wissell et al. | 331/2 |
| 7,248,481 B2 * | 7/2007 | Trobough | 361/785 |
| 7,298,625 B1 | 11/2007 | Wu et al. | 361/735 |
| 7,308,592 B2 * | 12/2007 | Schmunkamp et al. | 713/400 |
| 7,382,946 B2 * | 6/2008 | Oggioni et al. | 385/14 |
| 7,418,165 B2 | 8/2008 | Glebov et al. | 385/14 |
| 7,453,690 B2 | 11/2008 | Denny et al. | 361/679.33 |
| 7,457,128 B2 * | 11/2008 | Peterson | 361/728 |
| 7,562,247 B2 * | 7/2009 | Baker et al. | 714/2 |
| 7,596,539 B2 * | 9/2009 | Chatterjee et al. | 706/47 |
| 7,643,307 B2 * | 1/2010 | Bosco et al. | 361/757 |
| 7,690,927 B1 * | 4/2010 | Kerrigan et al. | 439/74 |
| 7,794,223 B2 * | 9/2010 | Kuo | 425/190 |
| 7,821,792 B2 | 10/2010 | Belady et al. | 361/735 |
| 8,108,731 B2 * | 1/2012 | DeCusatis et al. | 714/37 |
| 8,310,835 B2 | 11/2012 | Lin et al. | 361/760 |
| 8,328,571 B2 * | 12/2012 | Mulfinger et al. | 439/260 |
| 8,351,204 B2 * | 1/2013 | Yeo et al. | 361/695 |
| 2006/0001163 A1 * | 1/2006 | Kolbehdari et al. | 257/758 |
| 2008/0046774 A1 * | 2/2008 | Hirai et al. | 713/500 |
| 2008/0209097 A1 * | 8/2008 | Kerrigan | 710/302 |
| 2008/0250181 A1 * | 10/2008 | Li et al. | 710/302 |
| 2008/0313369 A1 * | 12/2008 | Verdoorn et al. | 710/62 |
| 2009/0156031 A1 * | 6/2009 | Staiger et al. | 439/151 |
| 2009/0327643 A1 * | 12/2009 | Goodman et al. | 711/173 |
| 2011/0085309 A1 * | 4/2011 | Yamada | 361/752 |
| 2011/0113160 A1 * | 5/2011 | Duisenberg et al. | 710/8 |
| 2011/0205718 A1 * | 8/2011 | Rosenberg et al. | 361/752 |
| 2012/0218698 A1 * | 8/2012 | Brodsky et al. | 361/679.02 |
| 2012/0221762 A1 * | 8/2012 | Brodsky et al. | 710/311 |
| 2013/0107879 A1 * | 5/2013 | Goldstein et al. | 370/386 |

* cited by examiner

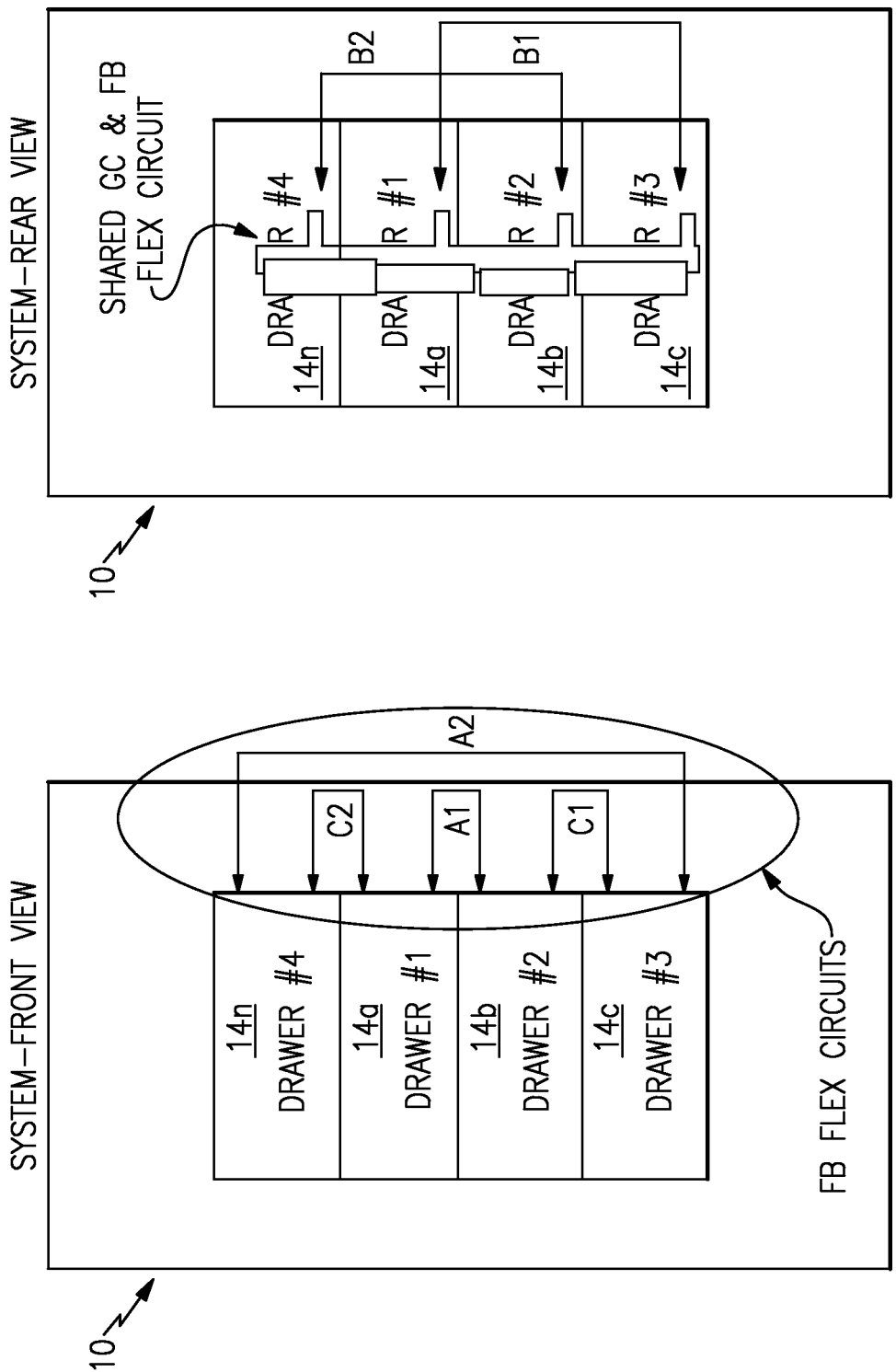

SHARED SYSTEM TO OPERATIONALLY CONNECT LOGIC NODES

RELATED APPLICATIONS

This application contains subject matter related to the following co-pending applications entitled "Electronic Assemblies Mating System" Ser. No. 13/035,921, "System to Operationally Connect Logic Nodes" Ser. No. 13/035,924, and "Logic Node Connection System" Ser. No. 13/035,926, the entire subject matters of which are incorporated herein by reference in their entirety. The aforementioned applications are assigned to the same assignee as this application, International Business Machines Corporation of Armonk, N.Y.

BACKGROUND

The invention relates to the field of computer systems, and, more particularly, systems that operationally connect logic nodes.

Recent developments of rack-mounted servers generally reside in two specific categories. The first of these are stand-alone servers which reside in a common rack, but do not communicate or share computing resources such as processor, memory, and/or I/O utilization, but share mechanical support, power, and/or cooling infrastructure.

The second category is associated with integrated servers, to which physical nodes not only utilize common mechanical support, power, and/or cooling infrastructure, but also are required to share computing resources. In this case, these physical nodes, e.g., books, drawers, blades, logic nodes, and/or the like, are required to share general communications such as common system-level clocking, service support processing function, and/or the like as well as specific inter-node computing functions via a fabric or parallel communication bus structure.

SUMMARY

According to one embodiment of the invention, a shared system to operationally connect logic nodes may include an inter-nodal circuit to provide communications between any connected logic nodes. The system may also include a fabric bus carried by the inter-nodal circuit, the fabric bus to provide logical connections to a first logic node and any other logic node. The system may further include a clock circuit carried by the inter-nodal circuit that controls both the inter-nodal circuit and the fabric bus.

The inter-nodal circuit may comprise a monolithic body. The system may also include at least one pluggable interconnect carried by the inter-nodal circuit configured to mate with a flexible service processor card, an oscillator card, and/or circuitry that supports the fabric bus thus operationally joining at least two connected logic nodes.

The flexible service processor card and/or the oscillator card may comprise a hot pluggable connection. The flexible service processor card and/or the oscillator card may comprise a featureable card. The connected logic nodes may comprise computer servers.

The system may include at least one other fabric bus connected to the inter-nodal circuit and controlled by the clock, with the at least one other fabric bus to provide logical connections to a second logic node and any other logic node. The at least one other fabric bus may comprise a flexible material. The at least one fabric bus may comprise a substantially rigid material adjoining the flexible material. The at least one other fabric bus may comprise a preformed offset along its length.

In an embodiment, the system may include a monolithic inter-nodal circuit to provide communications between any connected computer servers. The system may also include a fabric bus carried by the inter-nodal circuit, the fabric bus to provide logical connections to a first computer server and any other computer server. The system may further include a clock circuit carried by the inter-nodal circuit that controls both the inter-nodal circuit and the fabric bus.

In an embodiment, the system may include an inter-nodal circuit to provide communications between any connected logic nodes. The system may also include a fabric bus carried by the inter-nodal circuit, the fabric bus to provide logical connections to a first logic node and any other logic node. The system may further include at least one other fabric bus connected to the inter-nodal circuit, controlled by the clock, and comprised of flexible material, the at least one other fabric bus to provide logical connections to a second logic node and any other logic node. The system may additionally include a clock circuit carried by the inter-nodal circuit that controls the inter-nodal circuit, the fabric bus, and the at least one other fabric bus.

BRIEF DESCRIPTION OF THE DRAWINGS

FIG. 6 is a front view of an alternative embodiment of the system of FIG. 1.

FIG. 7 is a rear view of an alternative embodiment of the system of FIG. 1.

DETAILED DESCRIPTION

Figure 1:
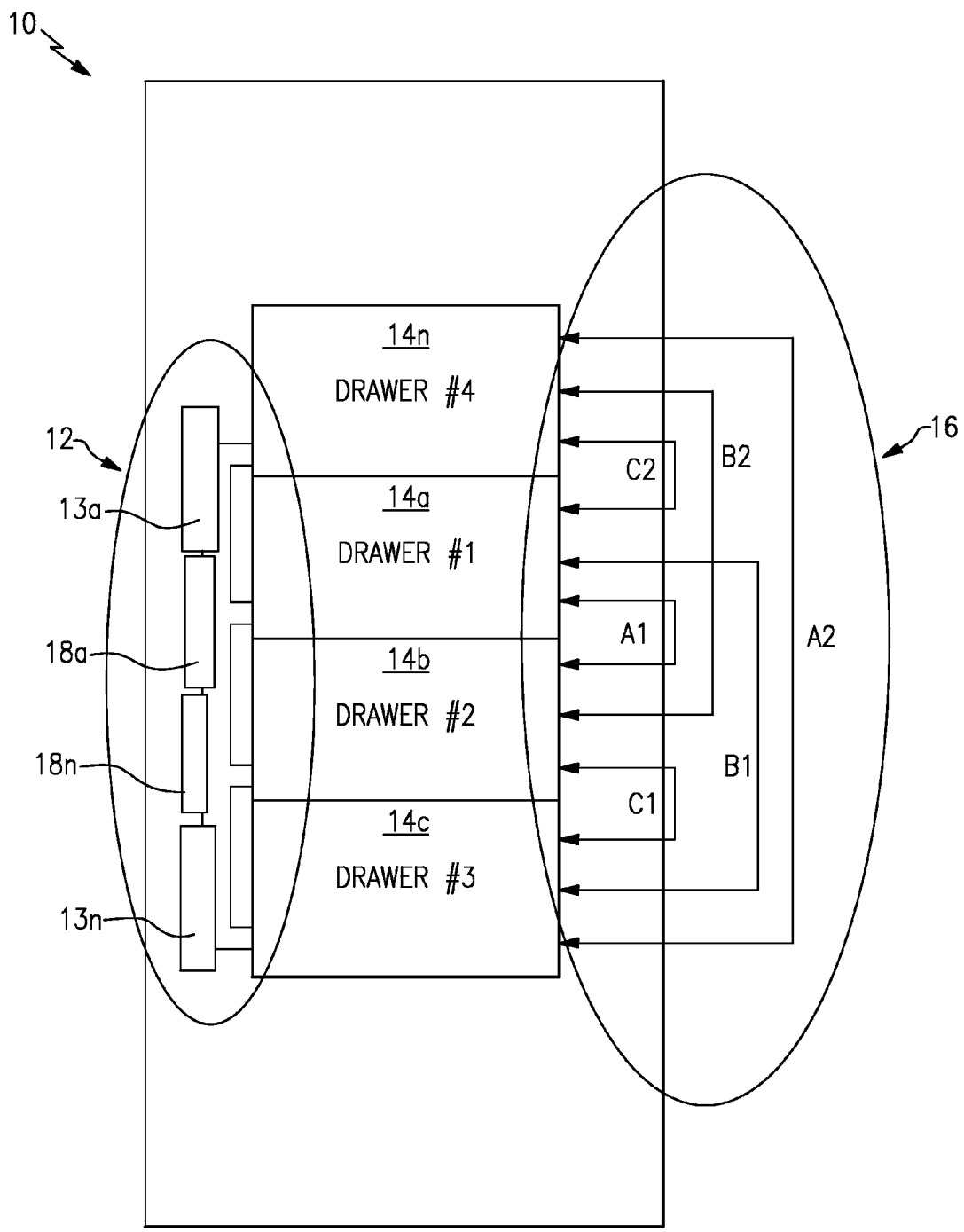
FIG. 1 is a front view of a system to operationally connect logic nodes in accordance with the invention.

The invention will now be described more fully hereinafter with reference to the accompanying drawings, in which preferred embodiments of the invention are shown. Like numbers refer to like elements throughout, like numbers with letter suffixes are used to identify similar parts in a single embodiment, and letter suffix lower case n is a variable that indicates an unlimited number of similar elements.

With reference now to FIGS. 6 and 7, a system 10 to operationally connect logic nodes 14a-14n is initially described. In an embodiment, a shared system 10 to operationally connect logic nodes 14a-14n include an inter-nodal circuit 12 to provide communications between any connected logic nodes. The system 10 also includes a fabric bus 16 carried by the inter-nodal circuit 12, the fabric bus to provide logical connections to a first logic node 14a-14n and any other logic node. The system 10 further includes a clock circuit 18a-18n carried by the inter-nodal circuit 12 that controls both the inter-nodal circuit and the fabric bus 16.

In an embodiment, the inter-nodal circuit 12 comprises a monolithic body. In another embodiment, the system 10 also includes at least one pluggable interconnect 40 carried by the inter-nodal circuit 12 configured to mate with a flexible service processor card 13a-13n, an oscillator card 18a-18n, and/or circuitry that supports the fabric bus 16 thus operationally joining at least two connected logic nodes 14a-14n.

In an embodiment, the flexible service processor card 13a-13n and/or the oscillator card 18a-18n comprise a hot pluggable connection. In another embodiment, the flexible service processor card 13a-13n and/or the oscillator card 18a-18n comprise a featureable card. In another embodiment, the connected logic nodes 14a-14n comprise computer servers.

In an embodiment, the system 10 includes at least one other fabric bus 16 connected to the inter-nodal circuit 12 and controlled by the clock circuit 18a-18n, with the at least one other fabric bus to provide logical connections to a second logic node 14a-14n and any other logic node. In another embodiment, the at least one other fabric bus 16 comprise a flexible material 22a-22n. In another embodiment, the at least one fabric bus 16 comprises a substantially rigid material 28, 26a-26n adjoining the flexible material 22a-22n. In another embodiment, the at least one other fabric bus comprises a preformed offset 28 along its length.

In an embodiment, the system 10 includes a monolithic inter-nodal circuit 12 to provide communications between any connected computer servers 14a-14n. The system 10 also includes a fabric bus 16 carried by the inter-nodal circuit 12, the fabric bus to provide logical connections to a first computer server 14a-14n and any other computer server. The system 10 further includes a clock circuit 18a-18n carried by the inter-nodal circuit 12 that controls both the inter-nodal circuit and the fabric bus 16.

In an embodiment, the system 10 includes an inter-nodal circuit 12 to provide communications between any connected logic nodes 14a-14n. The system 10 also include a fabric bus 16 carried by the inter-nodal circuit 12, the fabric bus to provide logical connections to a first logic node 14a-14n and any other logic node. The system 10 further includes at least one other fabric bus 16 connected to the inter-nodal circuit 12, controlled by the clock circuit 18a-18n, and comprised of flexible material 22a-22n, the at least one other fabric bus to provide logical connections to a second logic node 14a-14n and any other logic node. The system 10 additionally includes a clock circuit 18a-18n carried by the inter-nodal circuit 12 that controls the inter-nodal circuit, the fabric bus 16, and the at least one other fabric bus.

In view of the foregoing, the system 10 aids in operationally connecting logic nodes. In contrast, current rack-mounted servers have limitations.

Even though each category of rack-mounted servers has historically retained reasonable market share, recent trends in server consolidation, high performance computing, and increased system single image performance require both increased packaging density and effective inter-node communication means (i.e., cost, performance etc.). Historically, the packaging styles and communication functions have been addressed using the approaches described in Table 1 below; including the Pros and Cons of each.

TABLE 1

Interconnection Schemes

| Approach | Description | Pros | Cons |
| --- | --- | --- | --- |
| 1 | Two dimensional Flex Circuit | Build-as-go Low cost (pay-as-you-go) Applicable to drawer style physical nodes Supports effective front-back cooling | 2-D approach requires significant tail stock real estate Difficult I/O interconnection routing |
| 2 | Vertical Rigid back-plane | Applicable for both Book, Blade and Drawer | Prevents effective front-back cooling |
| 3 | Horizontal Rigid back-plane | Applicable for both Book and Blade physical node designs Supports effective front to back | Prevents Drawer physical node designs High implementation cost (total cost as part of base system) |
| 4 | Optical interface | Applicable for both Book, Blade and Drawer physical node designs Ease of interconnection routing | Required card packaging real estate High implementation cost (pay-as-you-go, but individual BMC still much greater than other approaches for constant or increasing bandwidth) |

As noted, no single approach addresses all needs. Furthermore, recent efforts to maximize server packaging density, has spirited the implementation of the more spatial effective drawer-style packaging design approach. Unfortunately, none of the aforementioned approaches provides the desired attributes of low cost (pay-as-you-go) and effective front to back cooling without requiring tailstock real estate and/or adversely effecting I/O interconnection routing.

The core idea disclosed by system 10 is the creation of a three-dimensional, flexible back-plane. In doing so, it provides a means of implementing a low-cost, drawer-drawer scheme for communications without adversely consuming the drawer's limited tailstock real estate, effecting the front-back cooling path and/or interfering with the required interconnecting routing, and supports concurrent maintenance or system growth for additional drawers.

As noted above, rack-mounted integrated servers require both an inter-node general communications (GC) as well as shared inter-node computing function on an interconnected fabric bus (FB). System 10 houses as part of the GC system, e.g., inter-nodal circuit 12, support for processing and clocking functions, each derived from common & redundant system-level control cards. These cards typically mate to the backplane and use common circuits to reach each logical node 14a-14n. On the other hand, the FB, e.g., fabric bus 16, is a means of interconnecting logical nodes 14a-14n on unique circuits to reach node pairs. Note, when only a single logic node 14a-14n is present, only GC interconnection is required. However, as nodes 14a-14n are added, they need to be subsequently added together to ensure complete point-to-point interconnection is established so computing resources can be shared (see Table for a typical interconnecting scheme for a four logical node system).

TABLE 2

Interconnections

| # of Nodes | GC | FB |
| --- | --- | --- |
| 1 | yes | N/A |
| 2 | yes | Nodes 1 to 2 |
| 3 | yes | Nodes 1 to 2, 1 to 3 and 2 to 3 |
| 4 | yes | Nodes 1 to 2, 1 to 3, 2 to 3, 1 to 4, 2 to 4 and 3 to 4 |

To address the above needs, two schemes have been devised, each using a flex circuit approach to complete the required communications path. The first approach uses dedicated flex circuits to address the GC 12 (i.e., flexible service processor (FSP) 13a-13n and clocking (OSC) 18a-18n functions) and the fabric bus (FB) 16 on completely separate physical assemblies. The second approach, utilizes flex circuit assemblies with both individual and combined communications to achieve the desired interconnectivity results.

Description of the two schemes and their associated embodiments is provided below. Note, although two schemes have been shown, other renditions and/or combinations can be witnessed by simply altering the bus assignments, etc.

Scheme #1: Dedicated Flex Circuits to address the required GC and F B communications. For this implementation, two separate and unique communication paths are established (see FIG. 1.). As depicted, two flex circuit paths have been established.

Figure 2:
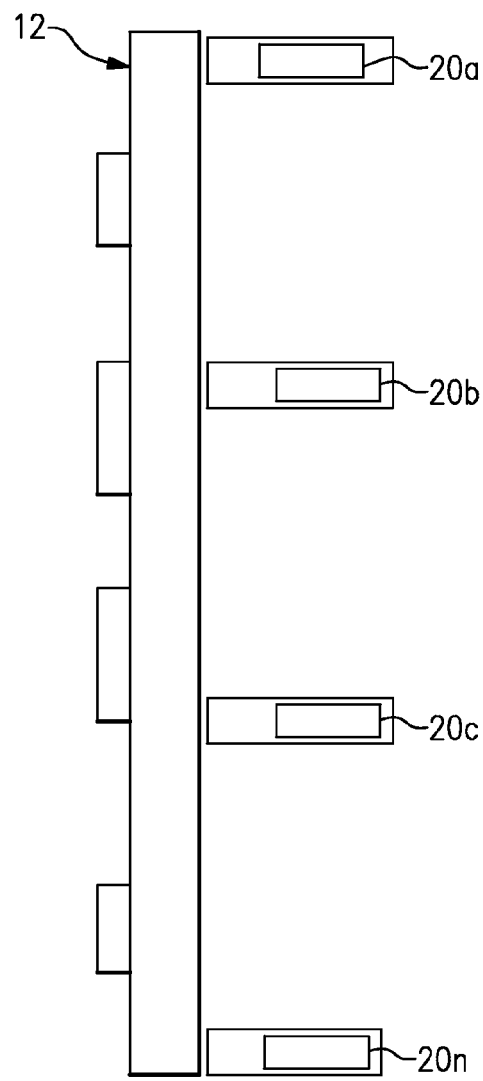
FIG. 2 is a front view of the inter-nodal circuit of FIG. 1.
Figure 3:
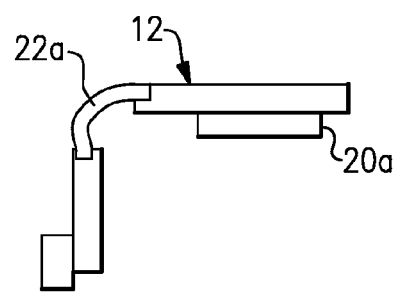
FIG. 3 is a top view of the inter-nodal circuit of FIG. 1.

Path #1: The first path provides GC 12, whereby a flex circuit comprising of pluggable interconnects are assembled onto the flex, to which separate OSC clock circuit 18a-18n and FSP cards are subsequently plugged (see FIGS. 2 & 3). These cards are both featureable as well as hot pluggable and this flex is installed, one per system and can facilitate front-side or rear-side card plugging, depending on the desired configuration.

Path #2: The second path for the FB 16 consists of a series or an assemblage of flex circuits. Each of these flex circuits are designed to support the interconnection of the various fabric bus 16 portions required as logical nodes 14a-14n are added. Since the necessity of these is based on the number of logical nodes 14a-14n installed, these are now added only on a need be basis only (hence a lower cost approach). To illustrate, Table 3 provides the typical build scheme to support the drawer configuration depicted in FIG. 1. Note, unconnected flex circuits A2 & B2 are added, in order, when adding Node #3 to facilitate ease of concurrent FB 16 expansion should Node#4 be added in the future. If concurrency is not desired, this plan ahead feature can be omitted, further lowering the cost of implementation.

TABLE 3

FB Installation Scheme

| # of Nodes | GC | FB |
| --- | --- | --- |
| 1 | yes | N/A |
| 2 | yes | Install & Connect A1 |
| 3 | yes | Install A2 & B2 (not plugged) and Install & Connect B1 & C1 |
| 4 | yes | Connect A2 & B2 and Install & Connect C2 |

Figure 4:
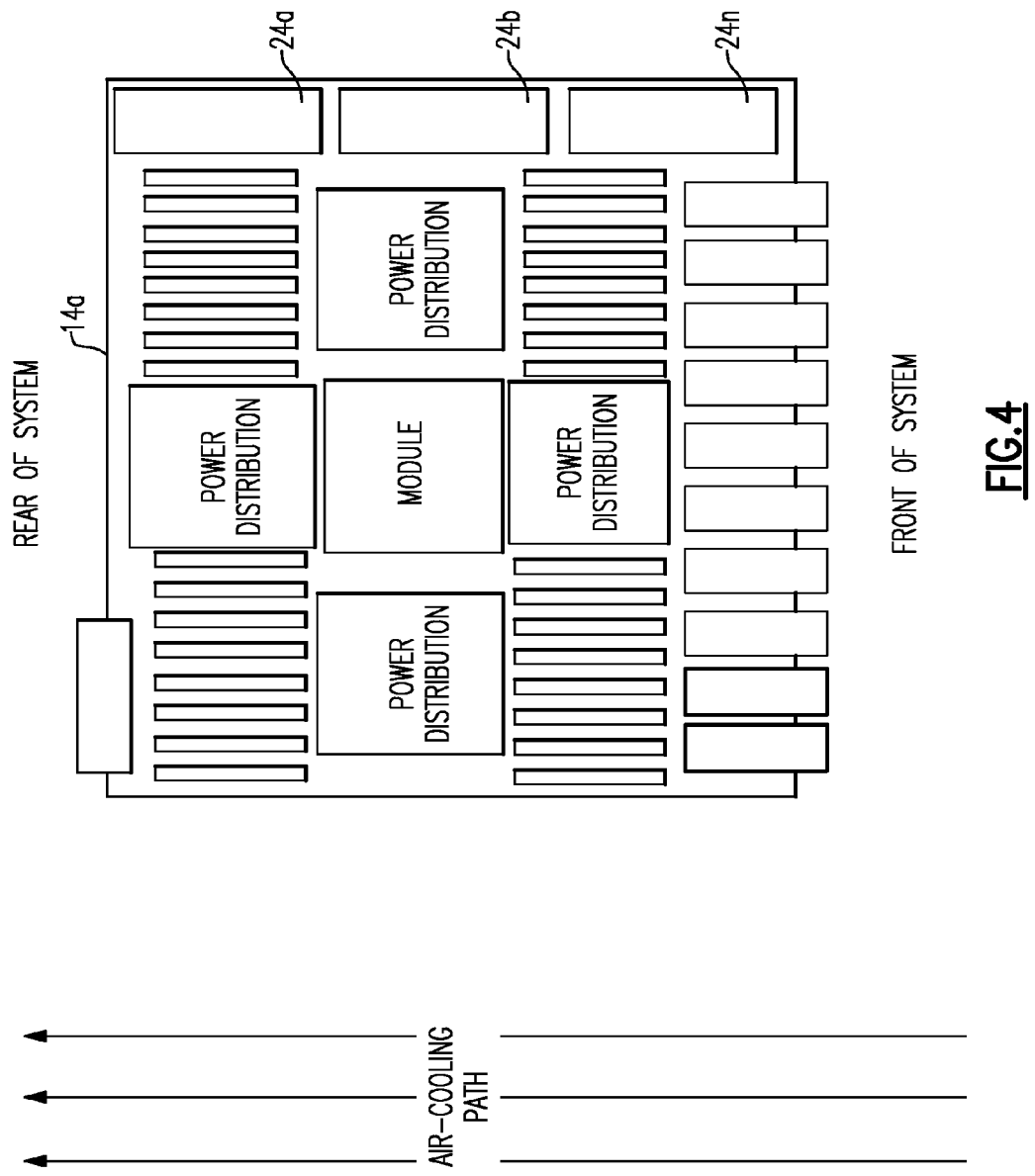
FIG. 4 is a top view of the system of FIG. 1

FIG. 4 is provided to better visualize the GC 12 and FB 16 implementation in a drawer packaging format. The general layout is provided for concept understanding, whereby the GC 12 and FB 16 connection locations are shown on the upper left and along the right card edge respectively.

As shown, housed on the right hand card edge are a series of Land Grid Array (LGA) pads 24a-24n to connect the various flex circuits 12 and/or 16 as Nodes 14a-14n are added to the system 10. In general, Fabric A 16 is either installed and connected or installed only to facilitate the node 14a-14n upgrade path. Since these overlap, the plan ahead noted in Table 3 provides for the concurrent ease of install without adversely affecting the operational fabric bus 16.

Figure 5:
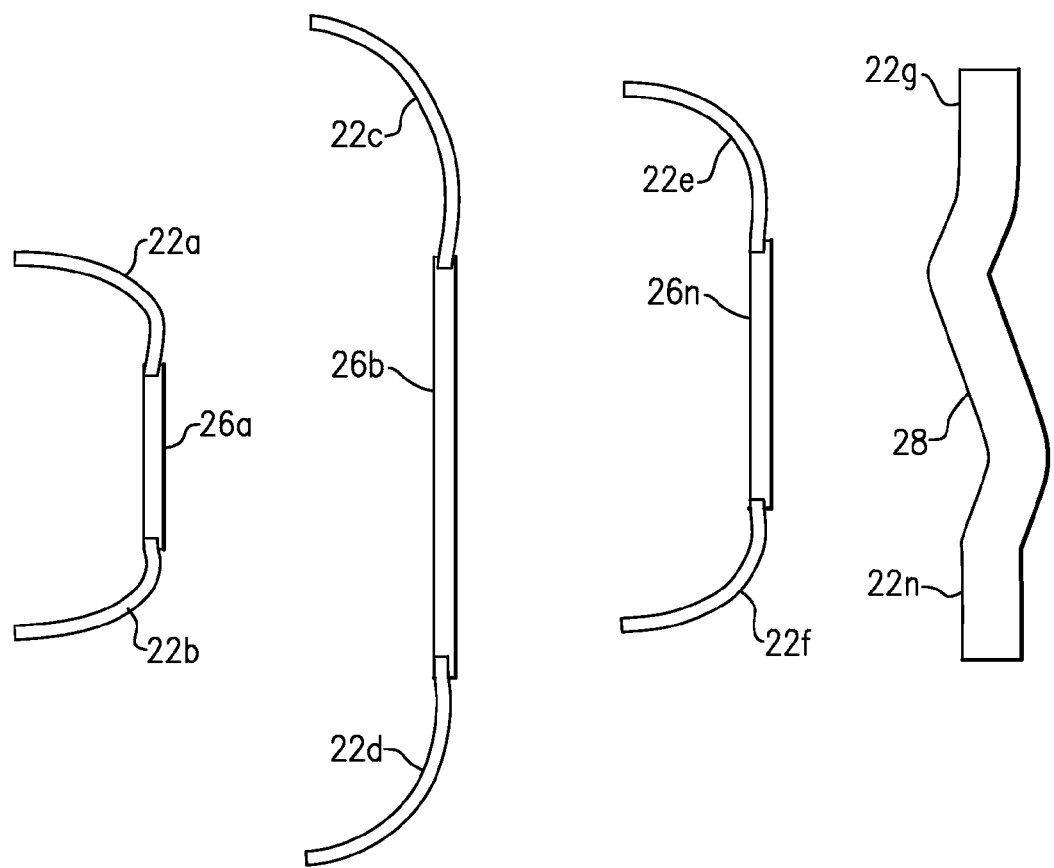
FIG. 5 is a side view of the components of the fabric bus of FIG. 1.

For the system 10 configuration depicted in FIG. 1, three different flex sizes are used (see FIG. 5). As depicted, flex circuits A and C are fairly straight-forward designs, while flex circuit B uses an offset in its design to address any overlap when installed in the system 10. To support the connection to the aforementioned FB 16 flex circuits, a compression-style LGA attachment mechanism is conceived to support the "build-as-you-go" assembly.

In an alternative embodiment, scheme #2 discloses a shared flex circuits to address the required GC 12 and FB 16 communications. For this implementation, a shared or common flex circuit is used to address the GC 12 and FB B 16 communication paths (see FIGS. 6 and 7). As depicted, two flex circuit paths have again been established, but in this case, the FB B 16 circuits are addressed via a common flex circuit positioned in the center back of the system 10.

In one embodiment a path #1 is disclosed where the first path provides GC 12 and FB 16-circuit B, whereby a flex circuit comprising of pluggable interconnects are assembled onto the flex, to which separate OSC 18a-18n and FSP 13a-13n cards are subsequently plugged (see FIGS. 2 and 3) as well as the circuitry to support FB B 16. The OSC 18a-18n and FSP 13a-13n cards are both featureable as well as hot pluggable, and plug into the rear side of the system 10. The FB B circuit is closed as drawers are added to the system and is resident to the central electronic complex, regardless of node population.

In another embodiment a scheme #2 is disclosed where scheme #2 is similar to scheme #1, and the second path for the FB 16 consists of a series or an assemblage of flex circuits. Each of these flex circuits are designed to support the interconnection of the various fabric bus 16 portions required as logical nodes 14a-14n are added. However, in this case, FB B 16 is already installed and therefore the flex circuit add is greatly simplified. Since FB B 16 resides in the system 10, it is a costlier approach then scheme #1, but the FB expansion association with concurrent adds is greatly simplified. To illustrate, Table 4 provides the typical build scheme to support the drawer configuration depicted in FIGS. 6 and 7.

TABLE 4

| FB Installation Scheme | | |
| --- | --- | --- |
| # of Nodes | GC | FB |
| 1 | yes | N/A |
| 2 | yes | Install & Connect A1 |
| 3 | yes | Install & Connect C1 |
| 4 | yes | Install & Connect C2 |

Figure 8:
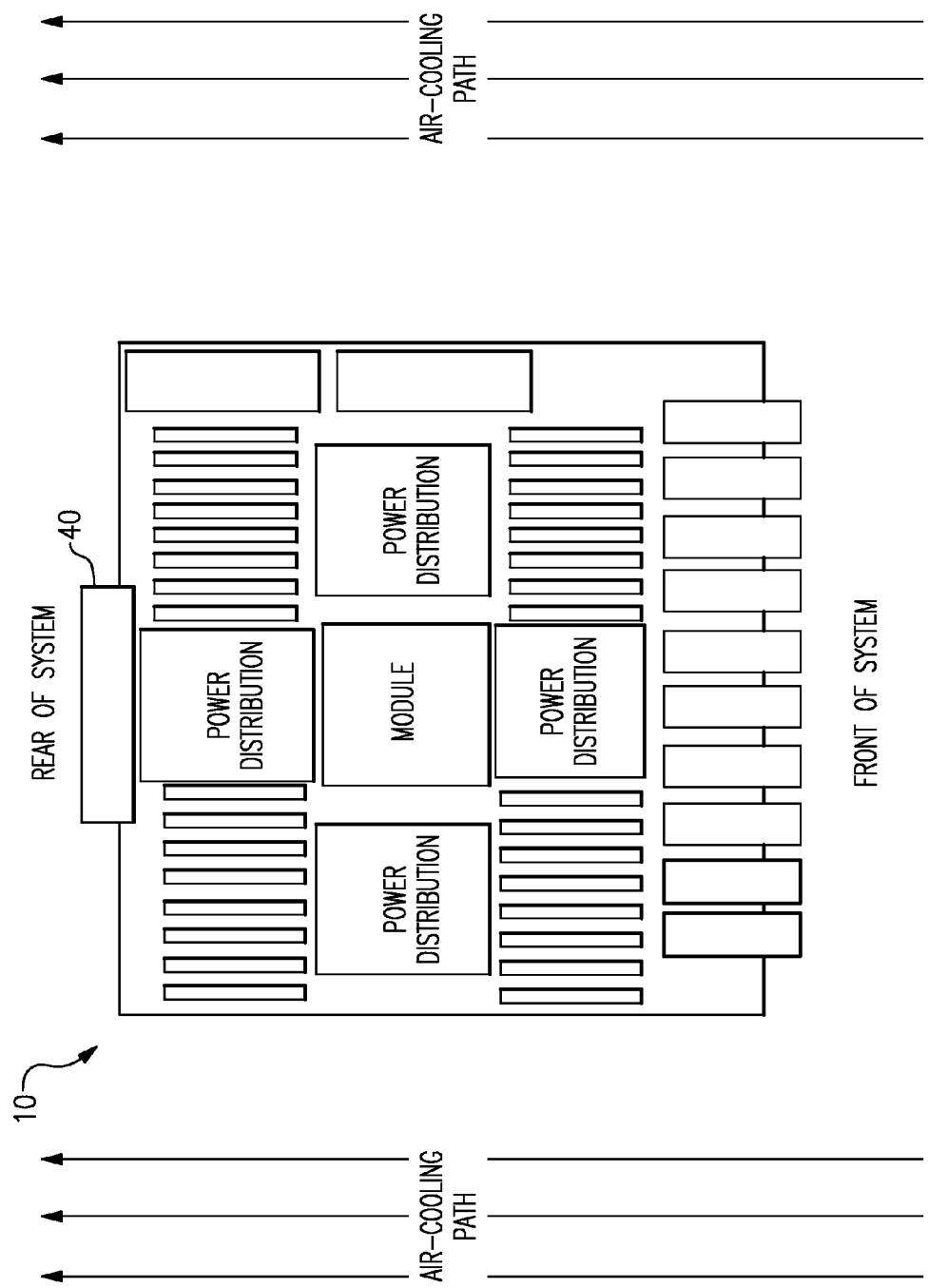
FIG. 8 is a top view of an alternative embodiment of the system of FIG. 1.

FIG. 8 is provided below to better visualize the GC 12 and FB 16 implementation in a drawer packaging format. The general layout is provided for concept understanding, whereby the GC 12 and FB 16 connection locations are shown on the upper left and along the right card edge respectively.

Figure 9:
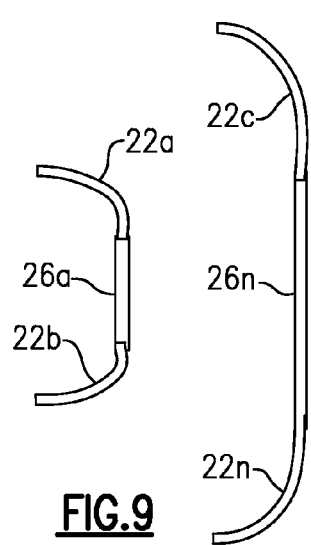
FIG. 9 is a side view of an alternative embodiment of the components of the fabric bus of FIG. 5.
Figure 10:
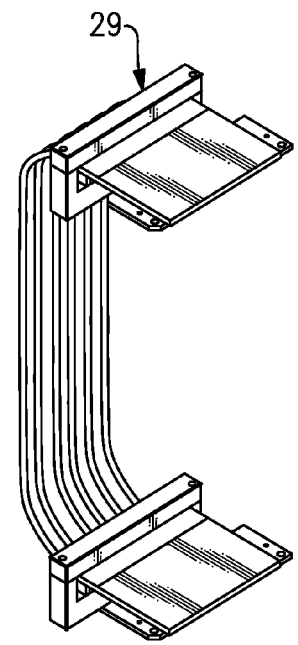
FIG. 10 is a top-side view of an alternative embodiment of the components of the fabric bus of FIG. 5.

As shown, housed on the right hand card edge are a series of Land Grid Array pads 24a-24n to connect the various flex circuits as Nodes 14a-14n are added to the system 10. In general, Fabric Buses A &C 16 are only installed and connected to facilitate the node 14a-14n upgrade path. For the system 10 configuration depicted in FIGS. 6 and 7 above, two different flex sizes are used as illustrated in FIG. 9.

Similar to scheme #1, the FB 16 flex connections are facilitated via the same LGA actuation mechanism described in FIG. 5.

As depicted in FIG. 5, the device employs a blind-mate lever or screw-driven actuation mechanism to individually mate and unmate the various FB 16 connections. Each device contains both the means of force application and any required degree of veridical compliancy to minimize stress across the connection interface as well as the necessary guidance system to accurately align the interfaced prior to finalizing the connection.

Figure 11:
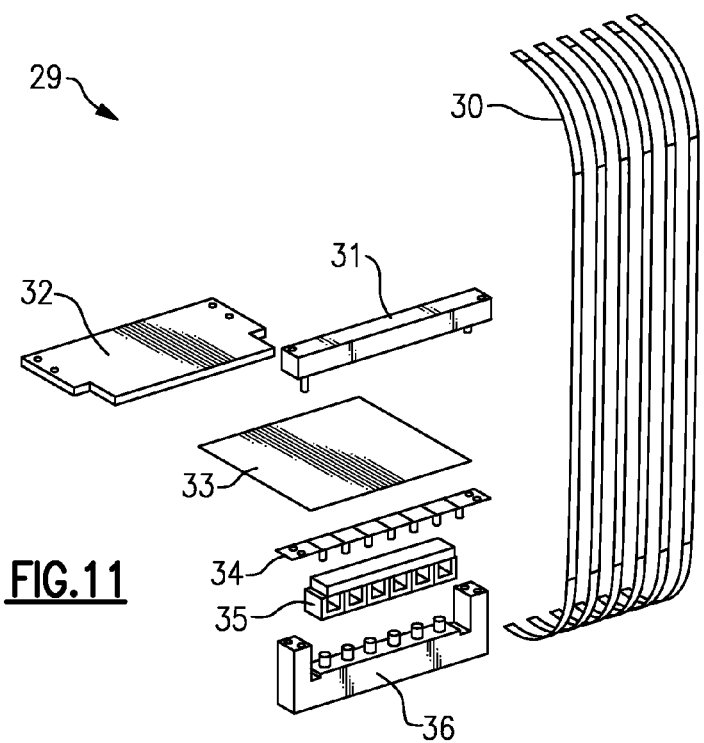
FIG. 11 is an exploded view of the alternative embodiment of FIG. 10.
Figure 12:
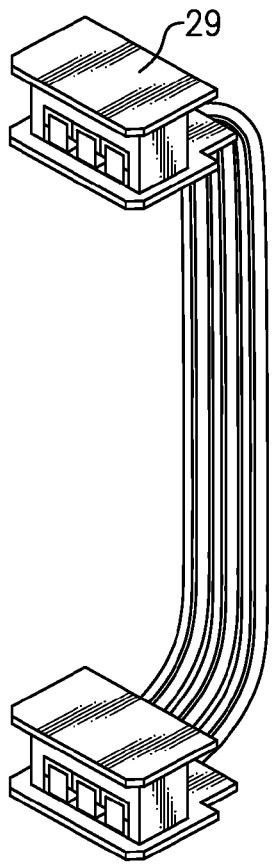
FIG. 12 is a top-side view of another alternative embodiment of the components of the fabric bus of FIG. 5.
Figure 13:
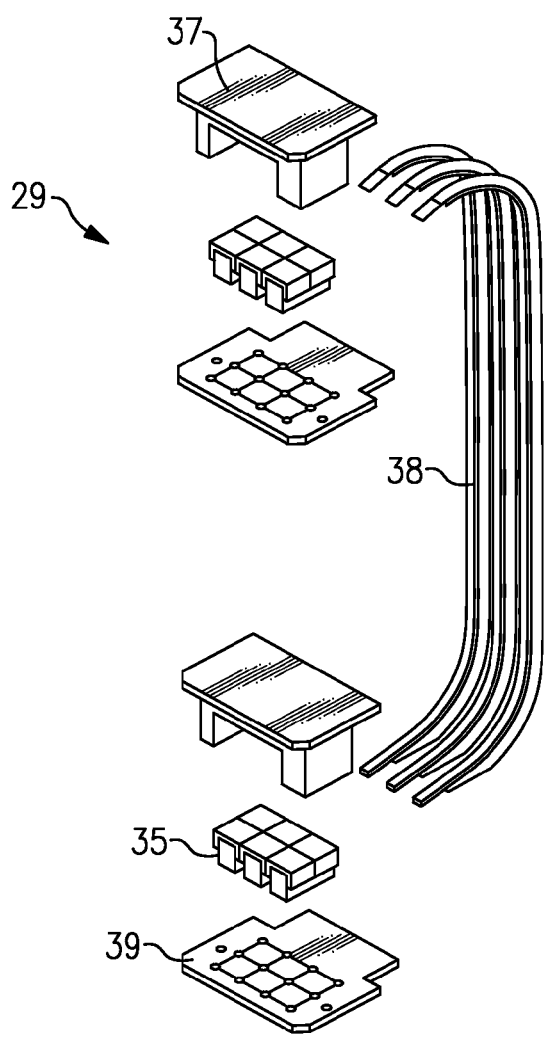
FIG. 13 is an exploded view of the alternative embodiment of FIG. 10.

As part of this disclosure, an optical version 29 to the electrical flex circuits is also disclosed. Specifically, an active optical fiber cable assembly is presented in FIGS. 10-13 (assembled and exploded views). FIG. 11 includes six optical fibers 30, a header 31, a seatbelt clip 32, a flex 33, an optical module organizer 34, optical modules 35, and an interface 36. FIG. 13 includes another embodiment of optical version 29 and includes module actuator and heat sink 37, optical cables 38, optical modules 35, and a module LGA and organizer 39. As depicted this assembly would be preassembled in a cluster of optical modules onto a printed circuit board (PCB) organizer using an LGA interface to the PCB and a Module Actuator/Heat sink. Assembled, one cluster per end, these assemblies would be installed in the system 10 in a similar manner as the aforementioned electrical flex assemblies.

One key difference is the necessity to address cooling of the optics. To this end, integrated into the system 10 would be an assembly interface to a cold-plate assembly.

The system 10 includes a number of different groups of embodiments. Firstly, a rack-level flexible backplane that facilitates "build-as-you-go" capability. In doing so, the circuits offer a third dimensional interconnection means to which to allow communication to multiple drawer entities 14a-14n. In addition, by nature of both their construction as well as their placement, one can exploit the enhanced packaging density and thermal cooling effectiveness of drawer-style packaging.

Secondly, individual fabric bus 16 side circuits are readily added without adversely effecting typical I/O connectivity routing schemes. Also, by creating individual buses 16, wiring density is reduced and therefore lending itself to inexpensive flex circuits. Note, additional features, such as enhanced I/O connectivity can be achieved by adding active components/circuitry to the individual flex circuits 12 and/or 16. Examples of this include optical interconnects to external I/O devices, system 10 control functions to non-system resident computing functions, e.g., zHybrid and/or the like.

Thirdly, flex circuit 12 and/or 16 LGA connection provides the ability to guide & align the connection as well as providing the required mating actuation force and interconnect compliance (see FIGS. 14-19 and 20-27 for electrical and optical versions, respectively).

Figure 14:
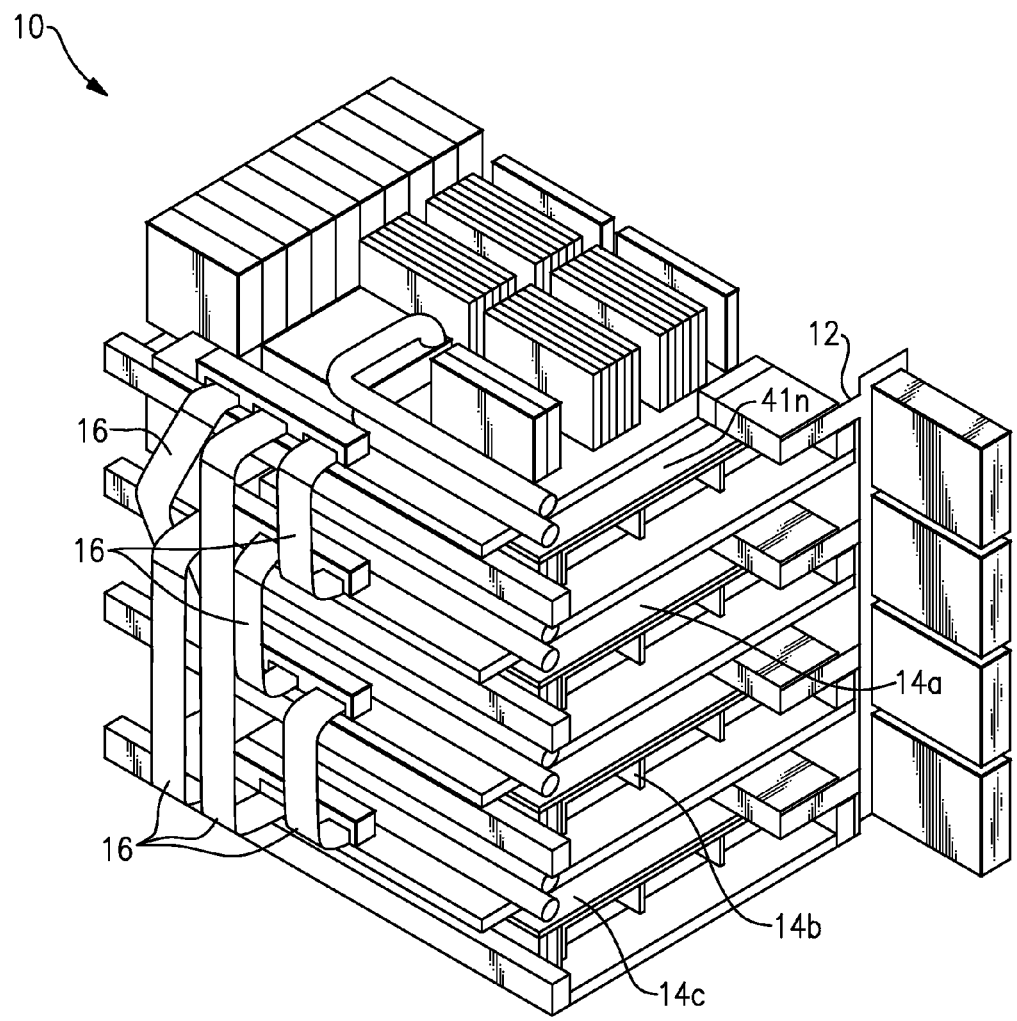
FIG. 14 is an iso view of a system to operationally connect logic nodes with electrical flex connectors in accordance with the invention.
Figure 15:
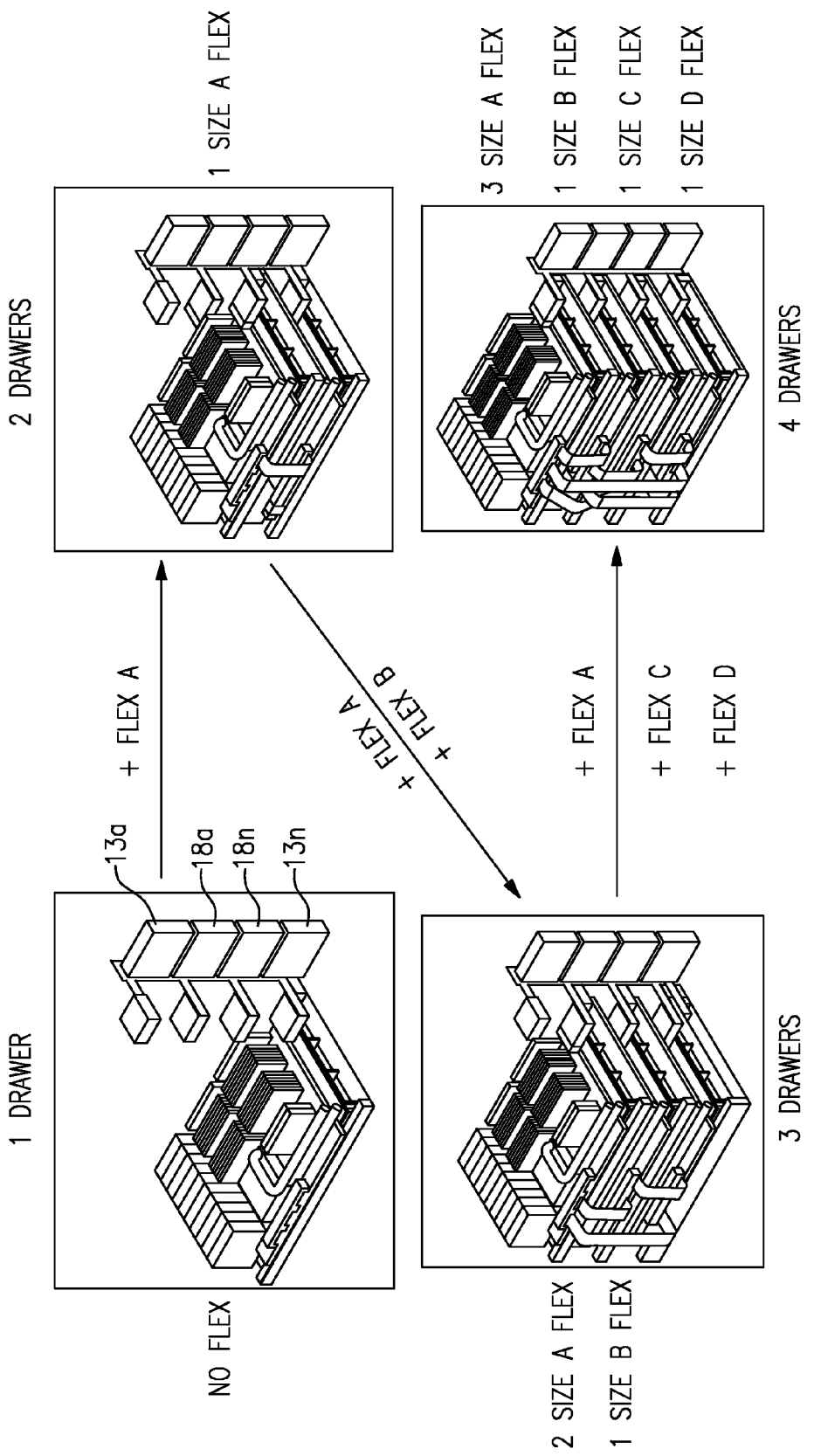
FIG. 15 is a build sequence for FIG. 14.
Figure 16:
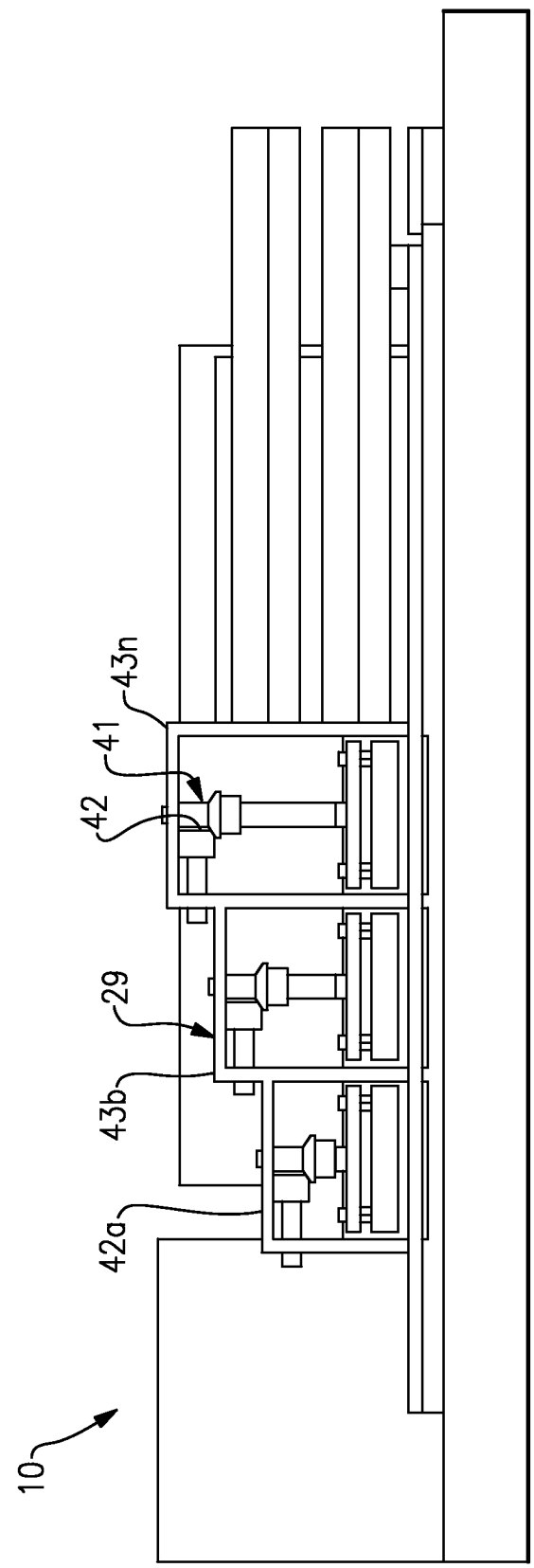
FIG. 16 is a side view of an electrical seat belt assembly in accordance with the invention.
Figure 17:
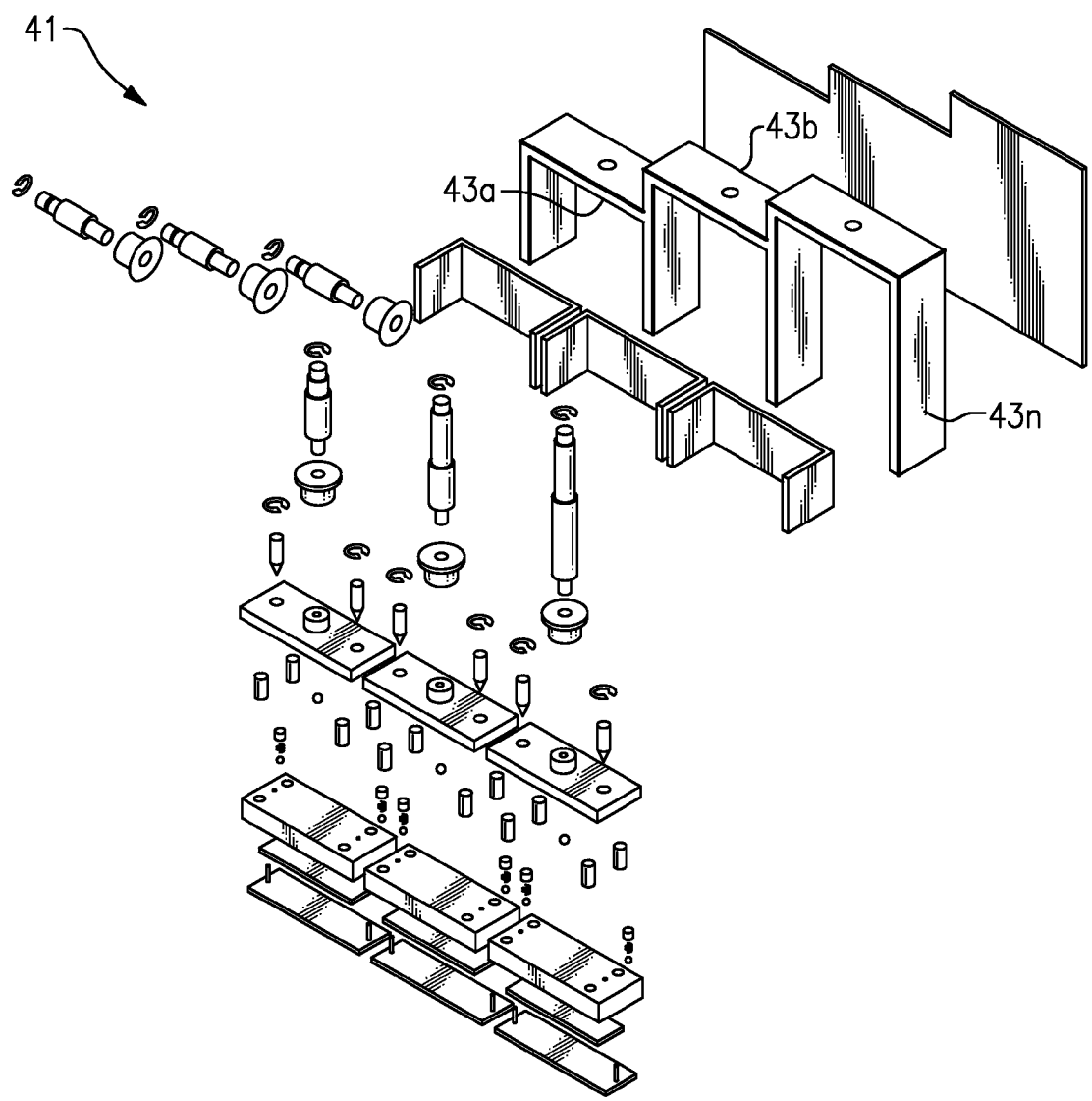
FIG. 17 is an exploded view of the electrical seat belt assembly of FIG. 16.
Figure 19:
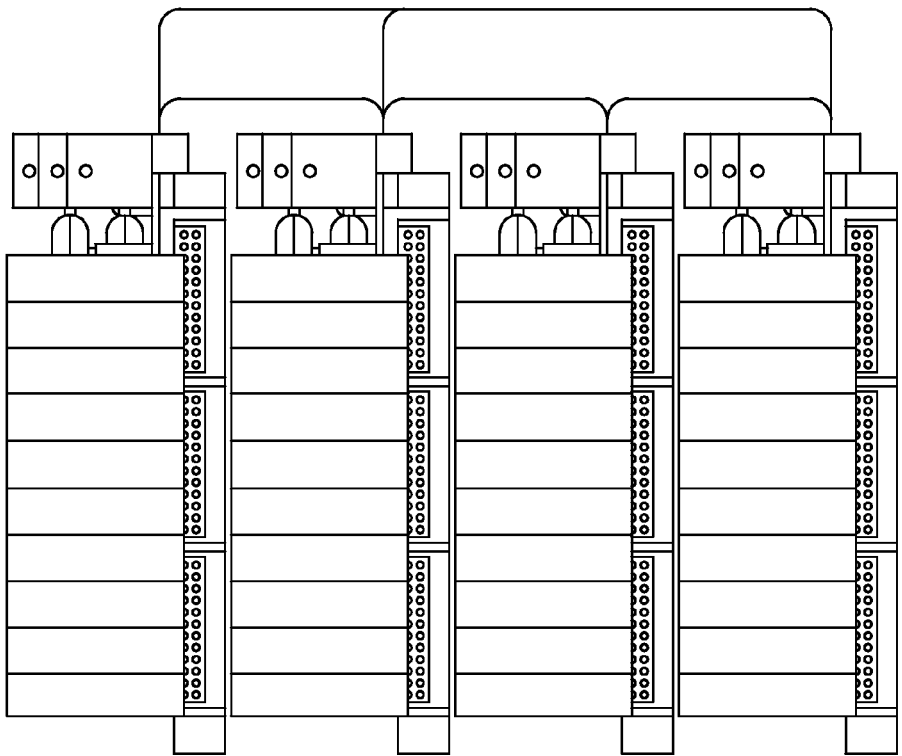
FIGS. 18-19 are an iso view of a three bay system to operationally connect logic nodes with optical flex connectors in accordance with the invention.
Figure 18:
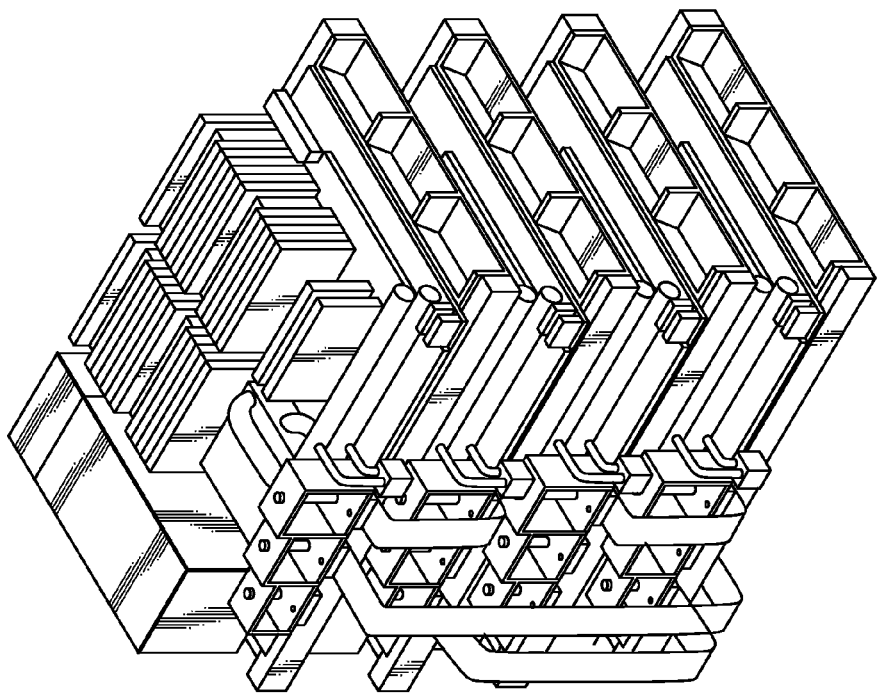
Figure 20:
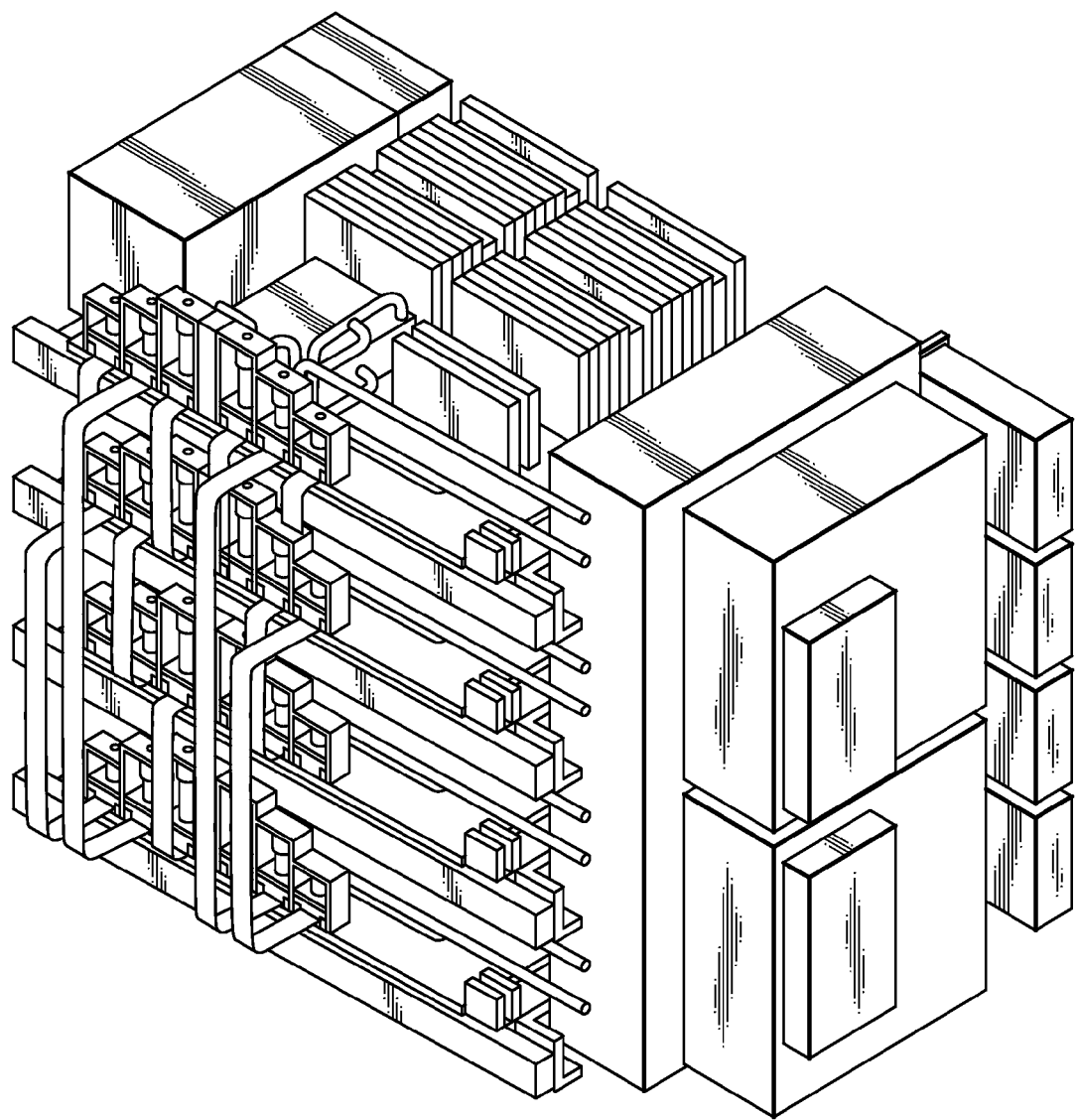
FIG. 20 is an iso view of a six bay system to operationally connect logic nodes with optical flex connectors in accordance with the invention.

In FIG. 14 the flex interconnect is configured for a four drawer system 10, and each flex end contains 16×60 (960 channels) LGA on 1 mm pitch. Also, the system 10 level FSP 13a-13n and OSC 18a-18n cards connect to rear of the drawer 14a-14n via a fingered backplane.

Figure 21:
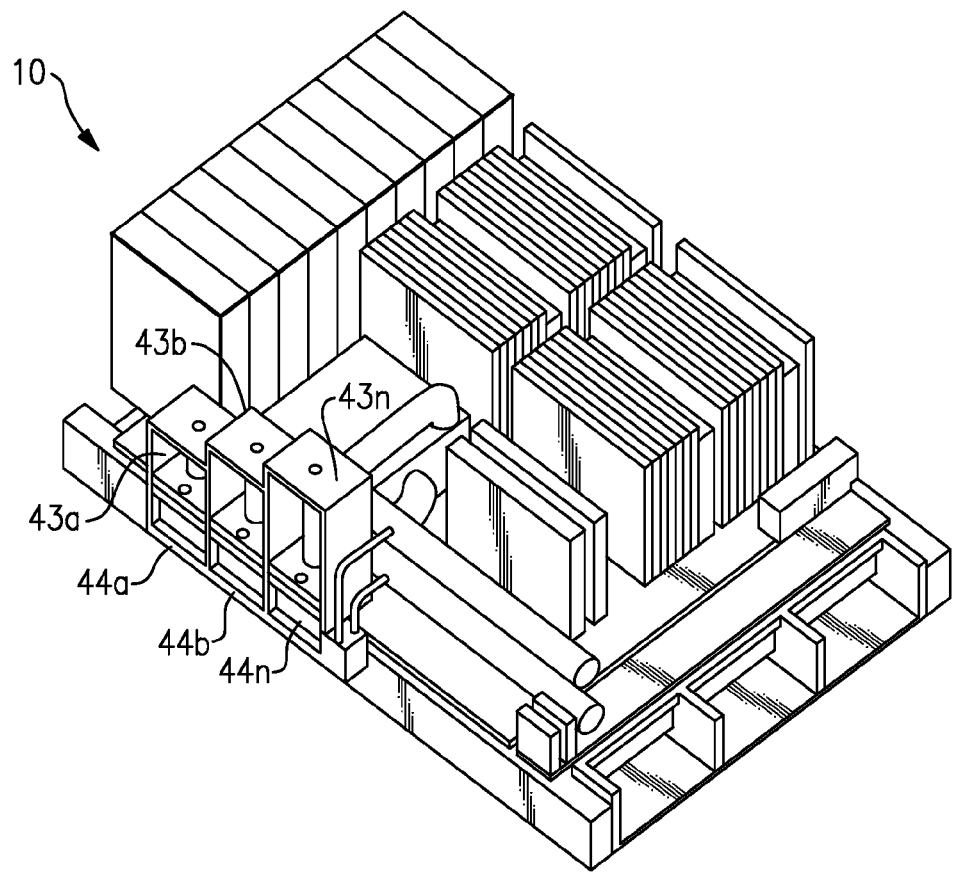
FIGS. 21-22 are views of a three bay optical cold plate system to operationally connect logic nodes in accordance with the invention.
Figure 22:
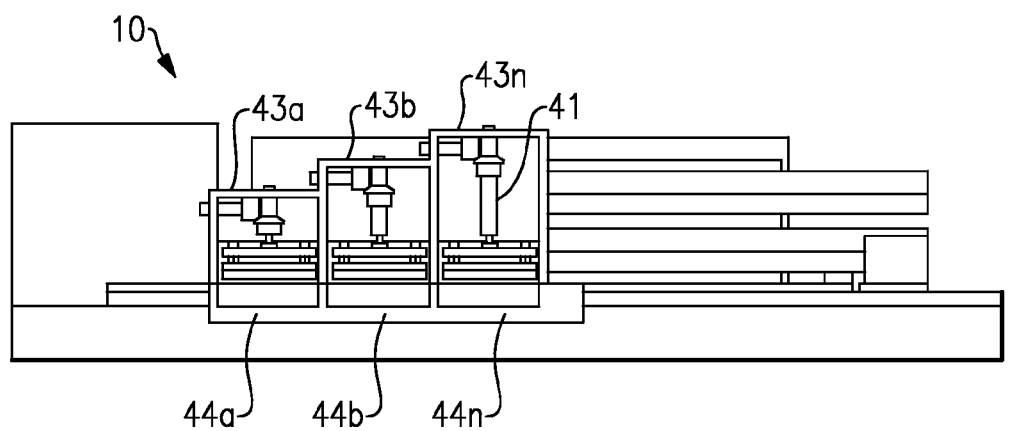
Figure 24:
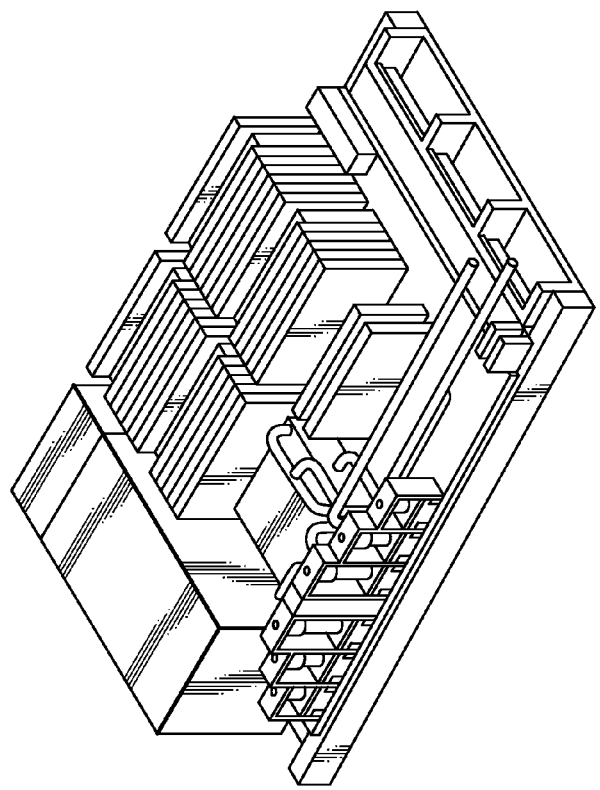
FIGS. 23-25 are views of a six bay optical cold plate system to operationally connect logic nodes in accordance with the invention.
Figure 23:
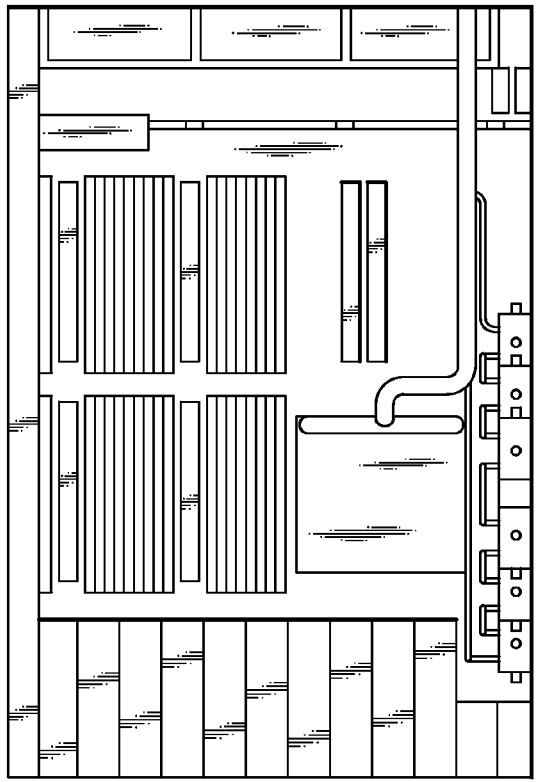
Figure 25:
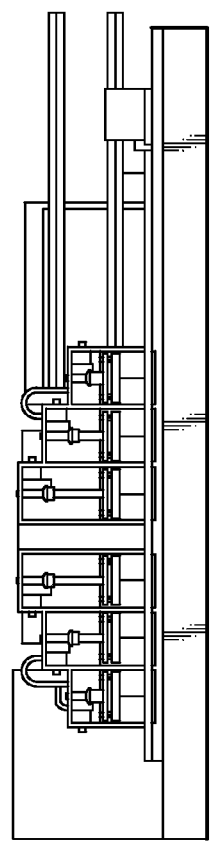
Figure 26:
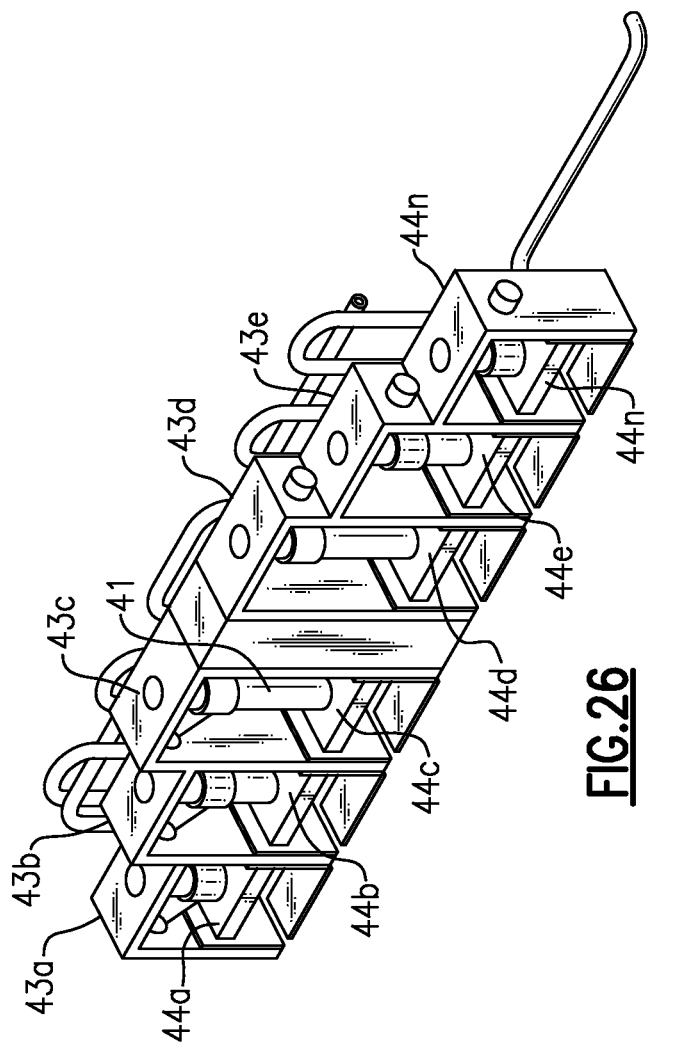
FIGS. 26-27 are views of a six bay optical garage/cold plate system to operationally connect logic nodes in accordance with the invention.
Figure 27:
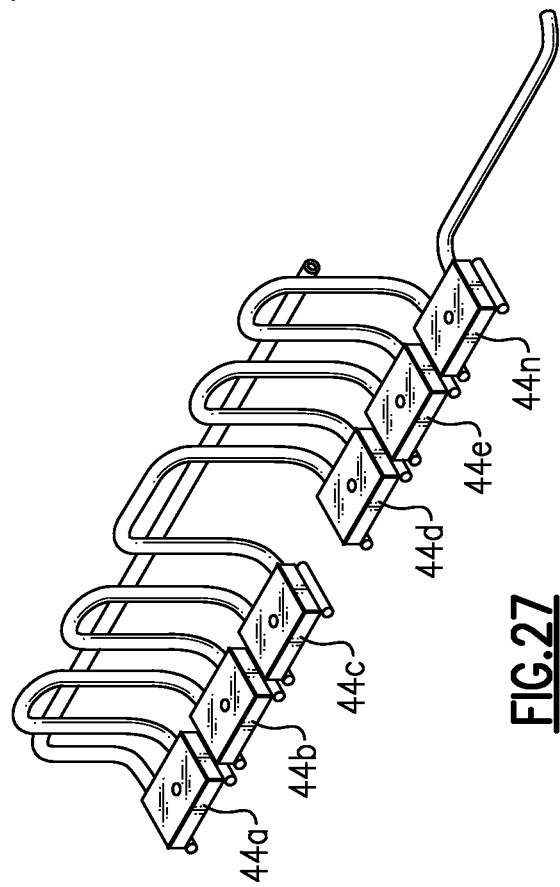

In FIGS. 21 and 22, a single actuation screw for actuating seatbelt clip to processor board LGA and for actuating an optical heat spreader against the cold plate is illustrated. In addition, multiple, in-line interconnect co-docking features (i.e., for FSP 13a-13n & OSC 18a-18n circuits) are illustrated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system for connecting logic nodes on rack-mounted servers, the system comprising:
   an inter-nodal flexible circuit to provide communications between any connected logic nodes, the inter-nodal flexible circuit including pluggable interconnects for mating with flexible service processor (FSP) cards;

a fabric bus carried by the inter-nodal flexible circuit, the fabric bus to provide logical connections to a first logic node and any other logic node; and a clock circuit carried by the inter-nodal flexible circuit that controls both the inter-nodal flexible circuit and the fabric bus.

2. The system of claim 1 wherein the inter-nodal flexible circuit comprises a monolithic body.

3. The system of claim 1 further comprising at least one pluggable interconnect carried by the inter-nodal flexible circuit configured to mate with at least one of a flexible service processor card, an oscillator card, and circuitry that supports the fabric bus thus operationally joining at least two connected logic nodes.

4. The system of claim 3 wherein at least one of the flexible service processor card and the oscillator card comprises a hot pluggable connection.

5. The system of claim 3 wherein at least one of the flexible service processor card and the oscillator card comprises a featureable card.

6. The system of claim 1 wherein the connected logic nodes comprise computer servers.

7. The system of claim 1 further comprising at least one other fabric bus connected to the inter-nodal flexible circuit and controlled by the clock, the at least one other fabric bus to provide logical connections to a second logic node and any other logic node.

8. The system of claim 7 wherein the at least one other fabric bus comprises a flexible material.

9. The system of claim 8 wherein the at least one fabric bus comprises a substantially rigid material adjoining the flexible material.

10. The system of claim 9 wherein the at least one other fabric bus comprises a preformed offset along its length.

11. A system comprising:

a monolithic inter-nodal flexible circuit to provide communications between any connected computer servers, the inter-nodal flexible circuit including pluggable interconnects for mating with flexible service processor (FSP) cards;

a fabric bus carried by the inter-nodal flexible circuit, the fabric bus to provide logical connections to a first computer server and any other computer server; and a clock circuit carried by the inter-nodal flexible circuit that controls both the inter-nodal flexible circuit and the fabric bus.

12. The system of claim 11 further comprising at least one pluggable interconnect carried by the inter-nodal flexible circuit configured to mate with at least one of a flexible service processor card, an oscillator card, and circuitry that supports the fabric bus thus operationally joining at least two connected computer servers.

13. The system of claim 12 wherein at least one of the flexible service processor card and the oscillator card comprises a hot pluggable connection.

14. The system of claim 12 wherein at least one of the flexible service processor card and the oscillator card comprises a featureable card.

15. The system of claim 11 further comprising at least one other fabric bus connected to the inter-nodal flexible circuit and controlled by the clock, the at least one other fabric bus to provide logical connections to a second computer server and any other computer server.

16. The system of claim 15 wherein the at least one other fabric bus comprises a flexible material.

17. The system of claim 16 wherein the at least one fabric bus comprises a substantially rigid material adjoining the flexible material.

18. The system of claim 17 wherein the at least fabric bus comprises a preformed offset along its length.

19. A system comprising:

an inter-nodal flexible circuit to provide communications between any connected logic nodes, the inter-nodal flexible circuit including pluggable interconnects for mating with flexible service processor (FSP) cards;

a fabric bus carried by the inter-nodal flexible circuit, the fabric bus to provide logical connections to a first logic node and any other logic node;

at least one other fabric bus connected to the inter-nodal flexible circuit, controlled by a clock circuit, and comprised of flexible material, the at least one other fabric bus to provide logical connections to a second logic node and any other logic node; and wherein the clock circuit is carried by the inter-nodal flexible circuit that controls the inter-nodal flexible circuit, the fabric bus, and the at least one other fabric bus.

20. The system of claim 1 further comprising at least one pluggable interconnect carried by the inter-nodal flexible circuit configured to mate with at least one of a flexible service processor card, an oscillator card, and circuitry that supports the fabric bus thus operationally joining at least two connected logic nodes.

* * * * *